United States Patent [19]

Peter

[11] Patent Number: 5,990,258

[45] Date of Patent: Nov. 23, 1999

[54] HIGH RESILIENCE, HIGH CLARITY POLYURETHANE ELASTOMER

[75] Inventor: Thomas H. Peter, Southbury, Conn.

[73] Assignee: Uniroyal Chemical Company, Inc., Middlebury, Conn.

[21] Appl. No.: 08/966,764

[22] Filed: Nov. 10, 1997

[51] Int. Cl.$^6$ .................................................. C08G 18/48
[52] U.S. Cl. ................................ 528/65; 528/76; 528/85; 301/5.3
[58] Field of Search ................................. 528/85, 76, 65; 301/5.3

[56] References Cited

U.S. PATENT DOCUMENTS

| | | | |
|---|---|---|---|
| 4,294,951 | 10/1981 | Sugita et al. | 528/55 |
| 4,555,562 | 11/1985 | Lee et al. | 528/72 |
| 5,264,620 | 11/1993 | Narayan | 560/351 |
| 5,312,844 | 5/1994 | Gonsior et al. | 521/99 |
| 5,599,874 | 2/1997 | Singer et al. | 524/590 |

FOREIGN PATENT DOCUMENTS 4332719  11/1992  Japan .

OTHER PUBLICATIONS

Encyclopedia of Polymer Science & Engineering; vol. 13; 1988, page 263.

*Primary Examiner*—Rachel Gorr
*Attorney, Agent, or Firm*—Raymond D. Thompson; Peter G. Dilworth

[57] ABSTRACT

A polyurethane elastomer possessing high resilience and high clarity is obtained by subjecting to polyurethane elastomer-forming conditions a polyurethane elastomer-forming reaction mixture comprising:

a) an isocyanate selected from the group consisting of diphenyl methane diisocyanate, isocyanate obtained from the reaction of polyol with MDI and mixtures thereof;

b) at least one polyol; and, c) at least one diol chain extender of the general formula:

$$HO-(CH_2)_x-OH$$

wherein x is an integer from 5 to about 16.

6 Claims, No Drawings

HIGH RESILIENCE, HIGH CLARITY POLYURETHANE ELASTOMER

BACKGROUND OF THE INVENTION

This invention relates to a polyurethane elastomer possessing both high resilience and high clarity.

Polyurethane elastomers are well known. See, e.g., U.S. Pat. Nos. 4,294,951, 4,555,562 and 5,599,874. Polyurethane elastomers can be formed by reacting an isocyanate, e.g., diphenyl methane diisocyanate, toluene diisocyanate, naphthalene diisocyanate, etc., with an organic polyol, e.g., polytetramethylene ether glycol, polyester diol, polyoxypropylene glycol, etc., and a chain extender, e.g., an aliphatic diol such as 1,4-butanediol. Additional components such as catalysts, surfactants and the like can also be added to the elastomer-forming reaction mixture in the usual amounts.

The reaction to form polyurethane elastomers can be a prepolymer process wherein an excess of an isocyanate is first reacted with an organic polyol to form an intermediate isocyanate-terminated prepolymer. The intermediate prepolymer is then contacted with a diol chain extender such as the aforementioned 1,4-butanediol, which reacts with the residual terminated isocyanate groups to form the polyurethane elastomer. Alternatively, a quasi-prepolymer or one-shot process may be employed. In the quasi-prepolymer process, a portion of the polyol is first reacted with the isocyanate to form a quasi-prepolymer. The remainder of the polyol and the diol chain extender are then reacted simultaneously with the quasi-prepolymer to form the polyurethane elastomer. In the one-shot process, all of the reactants are combined simultaneously to form the polyurethane elastomer.

SUMMARY OF THE INVENTION

In accordance with the present invention, a polyurethane elastomer possessing high resilience and high clarity is obtained by the process which comprises reacting under polyurethane elastomer-forming conditions a polyurethane elastomer-forming reaction mixture comprising:

a) an isocyanate selected from the group consisting of diphenyl methane diisocyanate (MDI), isocyanate obtained from the reaction of polyol with MDI and mixtures thereof;

b) at least one polyol; and, c) at least one diol chain extender of the general formula

HO—(CH$_2$)$_x$—OH wherein x is an integer from 5 to about 16.

The foregoing components can be reacted by the prepolymer, quasi-prepolymer or one-shot process. The quasi-prepolymer process is preferred.

The polyurethane elastomer of this invention possesses greater resilience and greater clarity than known polyurethane elastomers, i.e., those obtained with diol chain extenders whose alkylene groups possess fewer than five carbon atoms such as 1,4-butanediol. As such, the elastomer is especially well suited for applications where these properties are especially desirable, e.g., roller skate wheels.

DESCRIPTION OF THE PREFERRED EMBODIMENTS

MDI is an isomeric mixture composed of 4,4'-MDI containing from about 0 to about 60% by weight 2,4'-MDI and less than about 6% by weight of the 2,2'-MDI. MDI shall be understood herein to include MDI per se or a modified MDI such as carbodiimide-modified MDI, uretonimine-modified MDI, allophanate-modified MDI, and the like. The amount of MDI employed in the reaction mixture will ordinarily range from about 10 to about 50 weight percent, preferably from about 10 to 40 weight percent and more preferably from about 15 to about 30 weight percent, by weight of the reaction mixture.

Useful polyols include polyether polyols such as polytetramethylene ether glycol, polyethylene ether glycol, polypropylene ether glycol, polypropylene ether glycol-polyethylene ether glycol copolymers, and the like, and polyester polyols such as polycaprolactones, and the like. A preferred polyol is polytetramethylene ether glycol. The amount of polyol employed in the reaction mixture will ordinarily range from about 45 to about 90 weight percent, preferably from about 55 to about 90 weight percent and more preferably from about 65 to about 85 weight percent, by weight of the reaction mixture. The polyols employed in the reaction mixture herein can be in the form of a polyol mixture in which a polyether diol is the major component thereof. The average molecular weight of the polyol mixture will ordinarily range from about 200 to about 10,000 and preferably from about 500 to about 5,000.

Suitable diol chain extenders include pentanediol, hexanediol, heptanediol, octanediol, nonanediol, decanediol, undecanediol, dodecanediol, tridecanediol, tetradecanediol, pentadecanediol and hexadecanediol, and the like. The amount of diol chain extender employed in the reaction mixture will ordinarily range from about 2 to about 30 weight percent, preferably from about 2 to about 20 weight percent, and more preferably from about 3 to about 15 weight percent, by weight of the reaction mixture.

Reaction of the MDI, polyol and diol chain extender to form the polyurethane elastomer of this invention can be carried out in the presence of a catalyst. Useful catalysts include any of those known for this purpose and mixtures thereof, such as organic compounds of transition metals such as tin and tertiary amine compounds. A preferred catalyst for use herein is a dioctyl tin dimercaptide such as Formrez UL-32 which is available from Witco Corporation. The amount of catalyst employed in the reaction mixture, where present, will ordinarily range from about 0.001 to about 1 weight percent and preferably from about 0.003 to about 0.2 weight percent, by weight of the reaction mixture.

Various other additives can also be employed in preparing the polyurethane elastomer of this invention, e.g., plasticizers such as dioctyl phthlate and tributoxyethyl phosphate, which can be added to lower cost and/or improve the physical properties of the elastomer. Dyes can be added for color. In addition, pigments, antioxidants, antiozonants, UV stabilizers, and the like, can also be added in the customary amounts.

In preparing the polyurethane elastomer of this invention, conventional elastomer-forming procedures can be used. Thus, for example, the quasi-prepolymer process or the one-shot process can be used. In the quasi-prepolymer process, an isocyanate-terminated quasi-prepolymer is prepared by reacting a large molar excess of MDI with a polyol. This quasi-prepolymer is then further reacted with additional polyol, diol chain extender and any other components to provide the elastomer. In the one-shot process, the elastomer components are mixed all at once. It is especially advantageous to employ the quasi-prepolymer system in a meter-mix or reaction injection molding (RIM) system wherein, for example, metered amounts of part A made up of quasi-prepolymer and part B made up of polyol, diol chain extender and optional component(s), if any, are brought together under rapid mixing conditions and injected into a mold where elastomer formation takes place.

The following examples and comparative examples are illustrative of the preparation of the polyurethane elastomers of this invention.

EXAMPLE 1

100.63 g (equivalent weight=1019) of polytetramethylene ether glycol (PTMG) was mixed with 11.98 g of the diol chain extender 1,5 pentanediol and 0.02 g of Formrez UL-32 at 60° C. to form a curative mixture having a 1,5 pentanediol/PTMG mole ratio of 70/30. The curative mixture and the diphenyl methane diisocyanate (MDI) polyether prepolymer VIBRATHANE® B 878 having a free isocyanate group content of 12.4% and a viscosity of 2.0 poise at 100° C. are both heated to 60° C. and thoroughly degassed in a vacuum chamber to remove dissolved gases and moisture.

100 g of the VIBRATHANE® B 878 was then mixed with 97.9 g of the curative mixture. The mole ratio of the curative mixture to VIBRATHANE® B 878 was 0.97. After mixing for twenty seconds, the mixture was poured into a compression button mold having dimensions suitable for measuring hardness, resilience and clarity in an oven maintained at 115° C. The mixture gelled, i.e., no longer flowed freely, after approximately forty seconds. The gelled mixture was substantially cured to a polyurethane elastomer after five minutes. The elastomer was then removed from the compression button mold and oven to allow the elastomer to cool to room temperature. Following one week of conditioning at room temperature, the hardness, resilience and clarity of the polyurethane elastomer were measured and are shown in Table 1.

EXAMPLE 2

Example 1 was repeated but with the diol chain extender 1,5 pentanediol being replaced with an equivalent amount of 1,6 hexanediol to form the curative mixture. The curative mixture formed had a 1,6 hexanediol/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

EXAMPLE 3

Example 1 was repeated but with the diol chain extender 1,5 pentanediol being replaced with an equivalent amount of 1,8 octanediol to form the curative mixture. The curative mixture formed had a 1,8 octanediol/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

EXAMPLE 4

Example 1 was repeated but with the diol chain extender 1,5 pentanediol being replaced with an equivalent amount of 1,10 decanediol to form the curative mixture. The curative mixture formed had a 1,10 decanediol/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

Comparative Example 1

Example 1 was repeated but with the diol chain extender 1,5 pentanediol being replaced with an equivalent amount of 1,4 butanediol to form the curative mixture. The curative mixture formed had a 1,4 butanediol/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

Comparative Example 2

Example 1 was repeated but with the diol chain extender 1,5 pentanediol being replaced with an equivalent amount of 1,3 propanediol to form the curative mixture. The curative mixture formed had a 1,3 propanediol/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

Comparative Example 3

Example 1 was repeated but with the diol chain extender 1,5 pentanediol being replaced with an equivalent amount of the cycloaliphatic diol chain extender cyclohexanedimethanol (CHDM) to form the curative mixture. The curative mixture formed had a CHDM/PTMG mole ratio of 70/30. The mixture of VIBRATHANE® B 878 and the curative mixture had a gel time of about forty to forty five seconds. The hardness, resilience and clarity of the polyurethane elastomer were measured and are shown in Table 1.

Comparative Example 4

Example 1 was repeated but with the diol chain extender 1,5 pentanediol being replaced with an equivalent amount of the branched aliphatic diol chain extender butylethylpropanediol (BEPD) to form the curative mixture. The curative mixture formed had a BEPD/PTMG mole ratio of 70/30. The mixture of VIBRATHANE® B 878 and the curative mixture had a gel time of about twenty minutes and was substantially cured after about four hours. The hardness, resilience and clarity of the polyurethane elastomer were measured and are shown in Table 1.

Table 1 below presents the hardness, resilience and clarity measured for the polyurethane elastomers provided in Examples 1–4 and Comparative Examples 1–4 are shown in Table 1.

To measure hardness, a standard Rex Durometer Type A model 1700 hand-held hardness gauge known in the industry was used. In general, hardness of the polyurethane elastomer herein can vary from about 60 to about 100, and preferably from about 70 to about 95 Shore A units.

Resilience was measured by the drop ball rebound method. For this test, a ½ inch diameter stainless steel ball was dropped by a mechanical device from a height of one meter onto a ⅝ inch thick sample of the polyurethane provided in Examples 1–4 and Comparative Examples 1–4. A scale in centimeter increments behind the ball and polyurethane sample was used to determine the percent rebound of the original one meter height that was achieved on the first bounce. The polyurethane sample was mounted in a manner such that it could not move or vibrate, and the mounting surface and stand, if any, could not absorb energy, e.g., a heavy steel platform. The thickness of the polyurethane sample could vary by +/−⅛" without a significant effect on the percent rebound result. Ten bounces were performed with the best five being averaged. Therefore, the reproducibility was about +/−1 to 2%. Preferably, resilience of the polyurethane elastomer is at least about 50 and more preferably at least about 60 percent for a polyurethane elastomer having a hardness ranging from about 60 to about 80 Shore A units.

Clarity was determined by measuring the ability of an observer having 20-20 vision (with or without corrective lenses) to read through a ⅝" thick sample of the polyurethane provided in Examples 1–4 and Comparative Examples 1–4. Random 14 pitch Times New Roman capital letters were printed on plain white paper. The clarity index is given as the percent of letters than can accurately be identified by the observer through the polyurethane sample viewed from a distance of 18 inches. Preferably the clarity index of the polyurethane elastomer is at least 80 percent and more preferably 100 percent.

TABLE 1

| Sample | Diol Chain Extender | Hardness (Shore A) | Resilience (Percent) | Clarity Index (Percent) |
| --- | --- | --- | --- | --- |
| Example 1 | 1,5 pentanediol | 77–78 | 68–69% | 100% |
| Example 2 | 1,6 hexanediol | 77–78 | 68–69% | 100% |
| Example 3 | 1,8 octanediol | 79–80 | 71–72% | 100% |
| Example 4 | 1,10 decanediol | 80 | 73–74% | 100% |
| Comp. Example 1 | 1,4 butanedidl | 76–77 | 70% | 0% |
| Comp. Example 2 | 1,3 propanediol | 78–79 | 74–75% | 0% |
| Comp. Example 3 | CHDM | 64–65 | 41% | 100% |
| Comp. Example 4 | BEPD | 59 | 49% | 100% |

As illustrated in Examples 1–4, when using the diol chain extenders of this invention, both good resilience and clarity are achieved. However, as shown in Comparative Examples 1 and 2, diol chain extenders having less than 5 carbon atoms in the alkylene chain achieve good resilience and poor clarity. Also, as shown in Comparative Examples 3 and 4, chain extender structures other than the diol chain extenders of this invention achieve poor resilience and good clarity. None of Comparative Examples 1–4 provided a polyurethane elastomer possessing both good resilience and good clarity.

What is claimed is:

1. A roller skate wheel containing a polyurethane elastomer possessing a resilience of at least about 50 percent and a clarity index of at least about 80 percent obtained by subjecting to polyurethane elastomer-forming conditions a polyurethane elastomer-forming reaction mixture comprising:

a) an isocyanate selected from the group consisting of diphenyl methane diisocyanate, isocyanate obtained from the reaction of polyol with diphenyl methane diisocyanate and mixtures thereof;

b) at least one polyether diol: and, c) at least one diol chain extender of the general formula:

HO—(CH$_2$)$_x$—OH wherein x is an integer from 5 to about 16.

2. The roller skate wheel of claim 1 wherein the at least one polyether diol constitutes the major amount by weight of a polyol mixture containing at least one other polyol, the polyol mixture having an average molecular weight of from about 1,500 to about 3,000.

3. The roller skate wheel of claim 1 wherein the at least one polyether diol is polytetramethylene ether glycol.

4. The roller skate wheel of claim 2 wherein the polyether diol of the polyol mixture is polytetramethylene ether glycol.

5. The roller skate wheel of claim 1 wherein the at least one diol chain extender is selected from the group consisting of pentanediol, hexanediol, heptanediol, octanediol, nonanediol, decanediol, undecanediol, dodecanediol, tridecanediol, tetradecanediol, pentadecanediol, hexadecanediol and mixtures thereof.

6. The roller skate wheel of claim 1 wherein the polyurethane elastomer possesses a resilience of at least about 60 percent and a clarity index of 100 percent.

\* \* \* \* \*